Nov. 2, 1965  T. R. SHORT  3,215,117

VETERINARY PARAPLEGIC CART

Filed Jan. 27, 1964  2 Sheets-Sheet 1

Thayne R. Short
INVENTOR.

BY John C. Stahl

ATTORNEY

Thayne R. Short
INVENTOR.

BY John C. Stahl
ATTORNEY

United States Patent Office 3,215,117
Patented Nov. 2, 1965

3,215,117
VETERINARY PARAPLEGIC CART
Thayne R. Short, 1722 Baronne, New Orleans, La.
Filed Jan. 27, 1964, Ser. No. 340,306
5 Claims. (Cl. 119—1)

The present invention relates to a cart for crippled animals and more particularly to a cart which permits an animal afflicted with posterior paralysis or related afflictions of the spine and/or hind limbs to become completely ambulatory and self-propelling.

The majority of animals requiring mobile assistance are small animal paraplegics, such as dogs and cats, which have sustained spinal cord injuries in or near the lumbar region of the spine; this is the weakest portion of the spine and the area most vulnerable to injury. Mobile assistance is also desirable in cases of severe traumatic hindquarter injuries. Temporary forearm paralysis is not likely to occur as a separate entity since spinal cord injuries resulting in this syndrome would simultaneously result in paralysis of the respiratory system and death.

Regardless of the cause of neurological paralysis, the convalescence often lasts several months and most problems occur as a direct result of this lengthy recovery period. Moreover, physical and mental complications develop in the paraplegic that is not allowed to exercise; therefore, following adequate rest after spinal injury or spinal surgery, proper mobility must promptly be provided if the animal is to be restored to an eventual useful life.

Three important considerations must be met in dealing with these recovery problems. First, the primary injury which causes the paralysis must be protected from additional trauma during treatment and convalescence. Secondly, normal body position and posture must be restored in a comfortable manner and in such a way so as to permit unrestricted movement of the hind limbs. Finally, mobile support must not add an additional burden to the paraplegic but rather allow for efficient normal mobility on uneven terrain as well as on smooth surfaces. These three considerations are amplified in cases of permanent paralysis.

With these specific problems and considerations in mind, a mobile cart was designed and tested over an extended period of time, both in veterinary hospitals and in homes by untrained personnel. Its most common use to date has been to aid the dog afflicted with temporary hindquarter paralysis as a result of spinal cord injury either from a traumatic experience or rupture of the nucleus-pulposus (slipped disc) in the lower thoracic and/or lumbar spine. The latter condition normally requires one to two months recovery time, however, both conditions can become permanent.

Some of the complications and problems commonly associated with the paraplegic's recovery include decubital ulcers, constipation, retention of urine with bladder distention and empending cystitis, apathy, lack of exercise, disuse atrophy of leg muscles, habit scoliosis, pain associated with movements of an injured spinal column, dermatosis as a result of fecal and urinary contamination, the great amount of time required to give proper attention to the paraplegic, and the necessity of euthanasia in cases with permanent paralysis or those cases expected to require long convalescence. These complications have almost entirely been eliminated in those cases wherein the cart of the subject invention has been utilized.

In one prior art device for injured animals the animal is secured in a canvas sling by means of harnessing straps which pass over the back of the animal. It is obvious that such construction places an added strain on the very part of the spine which has been injured.

The novel cart of the subject invention, on the other hand, includes a saddle which comfortably supports the weight of the animal; secondly, the burden of the paralyzed hindquarters plus the manipulation of the cart is transferred and placed at the point of the shoulders, not the lumbar spine.

An object of the present invention is the provision of a mobile cart which enables an animal afflicted with posterior paralysis or related afflictions of the spine and/or hind limbs to become completely ambulatory and self-propelling.

Another object is to provide a cart which is comfortable to the animal and does not produce an additional strain on the injured members.

A further object of the present invention is the provision of such a device which may be quickly and easily applied to and removed from the animal.

Still another object is to provide a device which may conveniently be maintained in a sanitary condition.

A final object of the present invention is the provision of such a device which is light weight, extremely simple in construction, inexpensive to manufacture, easy to push, pull and turn by the animal, and universal in its adaptability.

Other objects and features of the invention will become apparent to those skilled in the art as the disclosure is made in the following detailed description of preferred embodiments of the invention as disclosed in the accompanying sheets of drawing in which.

Figure 1:
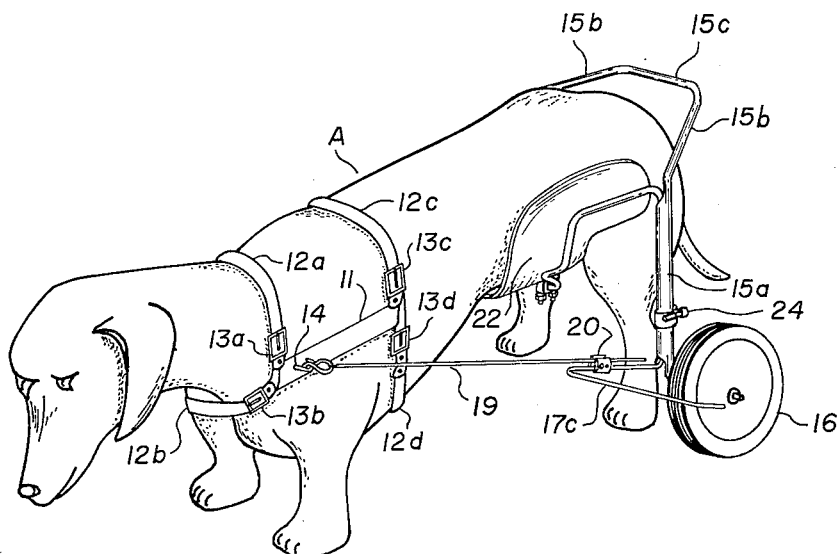
FIG. 1 is a perspective view of the subject invention showing the manner in which it is applied to an animal.

It is to be understood that although a dog, and more particularly a dachshund is illustrated in FIG. 1 of the drawings, the invention is not restricted to the use by the canine only but also may conveniently be used by felines. In addition, the principles and use of this cart are intended to apply to other members of the domestic family as well.

Referring now to the drawings, wherein like reference characters designate like or corresponding parts throughout the several views, there is shown in FIG. 1, which illustrates a preferred embodiment, an animal A which is secured to the cart of the subject invention as by means of an adjustable harness consisting of bars 11 to which are secured straps 12a–12d and buckles 13a–13d, respectively. One end of straps 12a, 12b are secured as by riveting or the like to one end of bar 11 while an end of straps 12c, 12d ar secured in like manner to the opposite end of said bar. The straps 12a–12d pass around the animal as shown in FIG. 1 and are adjustably secured to corresponding buckles 13a–13d which are attached to the end of bar 11 positioned on the opposite side of the animal. Preferably all buckles are attached to the bar 11 on one side of the animal in order to facilitate adjustment of the harness and the application and removal thereof from the animal. A D-ring 14 or the like is secured in a conventional manner to the outer surface of each bar 11 in proximity to the points of the shoulders of said animal.

Figure 2:
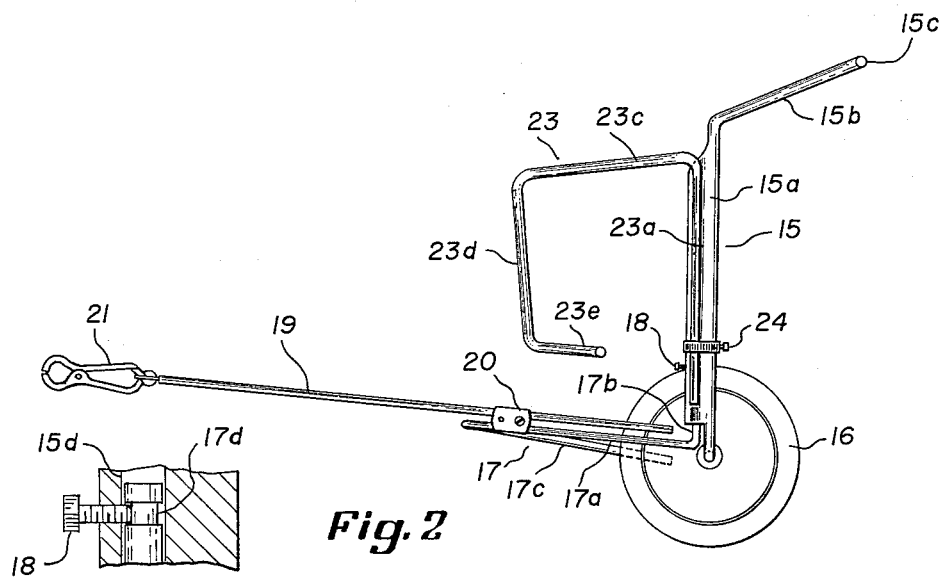
FIG. 2 is a side elevational view through the central, longitudinal plane of the device with the saddle removed.
Figure 3:
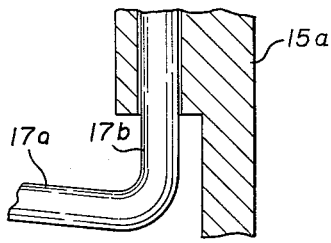
FIG. 3 is an enlarged, fragmentary view, partly in section, through the lower portion of the frame.
Figure 4:
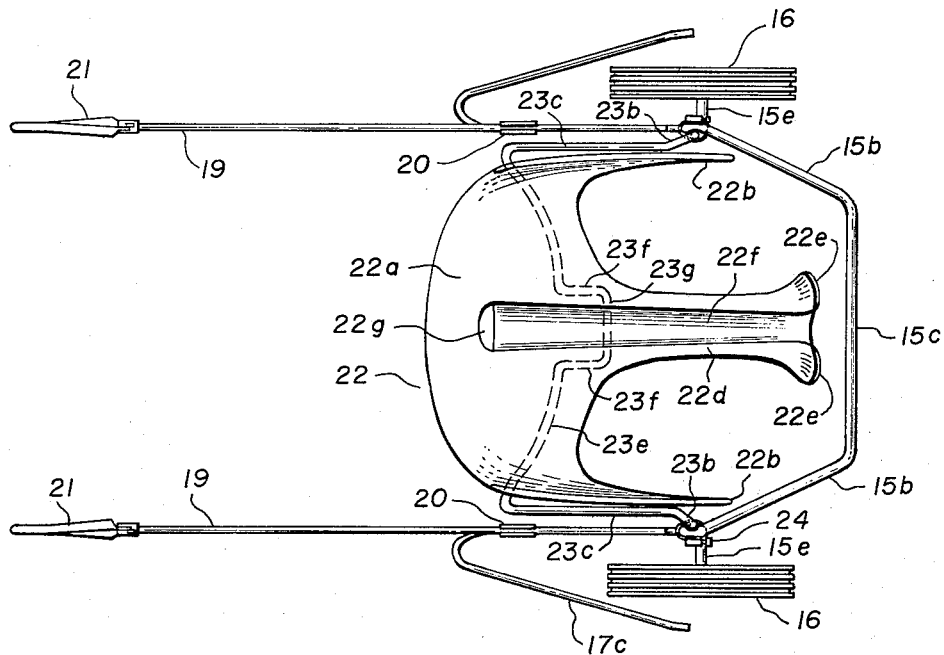
FIG. 4 is a top plan view of the device.

As best seen in FIGS. 2 and 4 of the drawings, the inverted, essentially U-shaped frame 15 includes vertical portions 15a; upwardly and inwardly, rearwardly-extending portions 15b; and a horizontal, cross member 15c. The frame is preferably of integral construction and is composed of stainless steel, aluminum or other light weight metal. Portions 15b, 15c of the frame conveniently pass above and behind the animal's rump. Such construction increases accessibility to the cart and also serves as a counterbalance whereby a portion of the weight of the cart is removed from the animal's shoulders. Vertical portions 15a include a longitudinal bore 15d (see FIG. 3) in the lower end thereof and also a perpendicularly out-turned axle shaft 15e (see FIG. 4) upon which is mounted a rubber tired wheel 16 which is secured to the shaft as by means of a cotter pin or other conventional locking means (not shown).

Referring now to FIGS. 2–4, member 17 is preferably constructed of rod, either solid or tubular, and includes a central portion 17a, an upwardly-extending end portion 17b which inserts into bore 15d in the vertical portions 15a, and an end portion 17c which is bent rearwardly and slightly downward, said end portion serves as a bumper guard for wheels 16. A set screw 18 (see FIG. 3) screwably inserts into vertical portions 15a and rides in an annular groove 17d in end portion 17b whereby the member 17 may be secured to the frame and yet allowed to rotate in a horizontal plane. Side rods 19 are adjustably secured at any desired position along the central portion 17a of member 17 as by means of a vise clamp 20 or the like. A conventional compress-to-open fastener 21 attaches to the foremost end of each rod 19, said fasteners insert into the D-rings 14 on both sides of the harness whereby the animal is detachably secured to the frame 15 which in turn supports the saddle 22 in which the animal is positioned. It is obvious that when the animal is placed in the saddle movement is provided by the forelimbs of the animal and the force is applied from the points of the shoulders.

A shaped, saddle bar 23, constructed of stainless steel, aluminum or other light weight metal, either tubular or solid, consists of a vertical portion 23a which is aligned with respect to and bears against or in a slightly recessed portion in the inner surface of vertical portions 15a of the frame; portion 23a is secured thereto as by means of a conventional screw clamp 24 which passes around portions 15a and 23a, respectively. Such clamp permits the saddle 22 to be adjusted to any desired height relative to the floor or ground.

As viewed in FIG. 4 of the drawings, the portion 23b of the saddle bar 23 is bent slightly inward; portion 23c is bent slightly downward (see FIG. 2) and essentially parallel to the longitudinal axis of the cart; portion 23d is turned perpendicularly downward with respect to portion 23c; portion 23e is bent slightly downward and rearward in a gradual arc, which portion terminates in a U-shaped portion consisting of sides 23f and cross member 23g.

Figure 5:
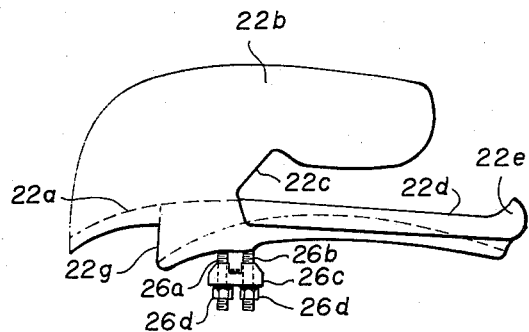
FIG. 5 is a side elevational view of the saddle.

The sadddle 22, in which the hindquarters of the animal is positioned, includes a slightly curved base 22a which preferably conforms to the abdomen, pubis and external genitalia of the animal; upstanding sides 22b are integrally formed with the base 22a and are swept back and bear against the animal's flanks whereby the animal is maintained in the saddle. As shown in FIG. 5 of the drawings, a shaped portion 22c has been removed from the sides of the saddle to allow unrestricted movement of the hindquarters.

Figure 6:
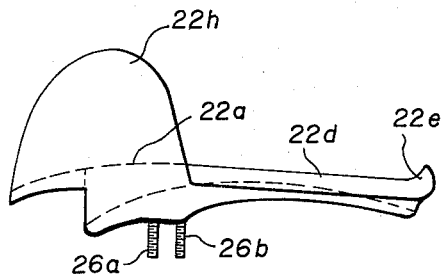
FIG. 6 is a side elevational view of a modification to the saddle.
Figure 7:
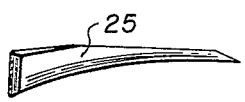
FIG. 7 is a perspective view of a sheath plug to be inserted in the lower portion of the saddle for conversion of the saddle for female use.

A medial, rearward extension 22d, integral with base 22a, terminates in a plane rearward of the trailing edge of sides 22b in an expanded and upstanding butt 22e. Channel 22f is provided in the base 22a and extension 22d as best seen in FIG. 4; as shown in the dotted line portions in FIGS. 5 and 6, said channel tapers gradually downward toward both ends and terminates in an opening 22g at the foremost end of the saddle and at the rearmost end in butt 22e. A shaped sheath plug 25 (see FIG. 7) inserts into the channel 22f and may be secured therein as by gluing or the like whereby the upper surface of the base and extension are essentially flat and the saddle may be used by a female animal. In the modification of FIG. 6, the upstanding sides 22h of the saddle are flat and essentially conical in plan. Downwardly depending threaded portions 26a–26b of a U-shaped bolt, secured in the lower surface of the saddle 22 with said threaded portions aligned with respect to the longitudinal axis of the saddle, pass over the cross member 23g of the saddle bar and are secured thereto as by means of a washer 26c and nuts 26d threaded thereon.

It is to be understood that the saddles may be molded in various sizes from a non-absorbent plastic or the like to accommodate animals of different size and varying anatomy. A custom fitted saddle may be constructed to exactly conform to a specific animal by cutting out a cardboard pattern which after fitting and any required modification is reproduced in hardware cloth. This hardware cloth is fashioned to form a negative impression of the abdomen and pubis of the animal being fitted and is then covered with tape followed by several layers of Fiberglas to build up the thickness and strength of the saddle. The saddle may then be covered by any commercially available, non-absorbent plastic which may be applied to the Fiberglas. After the plastic has dried the rough spots may be sanded or polished to remove any irregularities.

The animal may be placed in the saddle by lifting the hindquarters and placing the abdomen on the base 22a of the saddle in such a manner that the legs straddle extension 22d. The animal may then be harnessed to the cart by securing the fasteners 21 to the D-ring 14 on the harness. The animal may be removed from the saddle by reversing these steps.

There is actually little physical contact between the animal and the cart. Contact is essentially through the saddle which, in addition to its primary role as hindquarter support, is designed to allow for unrestricted urine and fecal evacuation when used by either the male or female patient. Furthermore, the construction of the saddle bar and the saddle is such as to allow limited fore and aft swing to accompany the movements of the torso during standing, walking and relaxing. The height of the saddle is adjusted so as not to allow the hind feet to buckle over when the animal attempts to walk. Such construction and saddle positioning permits the animal to stand up from the saddle and walk in a normal manner when desiring to do so, thus encouraging the use of the paralyzed limbs. The patient's hindquarters are not simply suspended off the floor.

It is to be understood, of course, that the foregoing disclosure relates to only preferred embodiments of the invention and that it is intended to cover all changes and modifications of the examples of the invention herein chosen for the purposes of the disclosure, which do not constitute departures from the spirit and scope of the invention.

Having described the invention, what is claimed is:

1. A mobile cart for paraplegic animals comprising an inverted U-shaped frame, wheels mounted on said frame, a shaped saddle bar adjustably secured to said frame, a preformed saddle secured to said saddle bar, shoulder harness means including a horizontal bar fitted to the front body area of said animal, rearwardly extending elongated rods including fastening means, said fastening means detachably connected to said harness bar means, shaped means rotatably connected to the frame, and clamping means securing said rods to said shaped means.

2. A cart for paraplegic animals comprising harness means fitted to the animal, ring means secured to said harness at the points of the animal's shoulders, a frame including wheels, a shaped means secured to said frame, elongated rods including fastening means detachably secured to said ring means, clamping means securing said rods to said shaped means, a saddle including upstanding side wall portions and a medial rearwardly extending portion, and means adjustably connecting said saddle to said frame.

3. The invention of claim 2 including a channel in said saddle and medial rearwardly extending portion.

4. A cart for paraplegic animals comprising harness means fitted to the animal, ring means secured to said harness at the points of the animal's shoulders, a frame, wheels mounted on said frame, shaped means secured to said frame, elongated rods including fastening means detachably secured to said ring means, clamping means securing said rods to said shaped means, a saddle including a rearwardly extending medial portion, a channel in said saddle and medial rearwardly extending portion, downwardly depending threaded portions secured in the lower surface of said saddle, a saddle bar adjustably secured to said frame, said threaded portions passing over said saddle bar and secured thereto.

5. The invention of claim 4 including a shaped plug inserted into and secured in said channel.

References Cited by the Examiner
UNITED STATES PATENTS

| | | | |
|---|---|---|---|
| 2,546,726 | 3/51 | Creamer | 119—1 |
| 2,976,840 | 3/61 | Hugus | 119—1 |

OTHER REFERENCES

Washington Sunday Star, April 22, 1951, picture of dog, page A-5.

SAMUEL KOREN, *Primary Examiner.*

ALDRICH F. MEDBERY, *Examiner.*